United States Patent Office 3,372,091
Patented Mar. 5, 1968

3,372,091
METHOD FOR PREPARING HEXAMETHYLENE-
TETRAMINE HIPPURATE AND TABLETS
THEREOF
Stanley E. Harnett and Nicolas A. Lagoon, Sherman Oaks, Calif., assignors to Rexall Drug and Chemical Company, Los Angeles, Calif., a corporation of Delaware
No Drawing. Filed Jan. 25, 1965, Ser. No. 427,955
2 Claims. (Cl. 167—82)

ABSTRACT OF THE DISCLOSURE

This invention is directed to a method of preparing tablets of hexamethylenetetramine hippurate wherein the chemical reaction forming the hexamethylenetetramine hippurate occurs simultaneously with the preparation of a physical form of the salt which is suitable for tablet formation, said method comprising the mixing of substantially equimolar proportions of hexamethylenetetramine with hippuric acid in the presence of a liquid medium consisting of water only present in an amount of between about 0.5 and 12.5 percent by weight of the mixture, drying the mass, comminuting the dried mass, and forming tablets therefrom.

---

This invention relates to a process for preparing a composition of matter classified in the art of chemistry as hexamethylenetetramine hippurate and also to a method of preparing tablets thereof.

The invention sought to be patented, in a first process aspect, resides in the process of preparing hexamethylenetetramine hippurate which comprises mixing hexamethylenetetramine with hippuric acid in the relative proportions of 0.8 to 1.0 mole of hexamethylenetetramine for each mole of hippuric acid in the presence of between about 0.5 and about 12.5 percent by weight of the mixture of water or its hereinafter described equivalents.

The invention sought to be patented, in a second process aspect, resides in the process of preparing tablets of hexamethylenetetramine hippurate which comprises mixing substantially equimolar proportions of hexamethylenetetramine with hippuric acid in the presence of between about 0.5 and about 12.5 percent by weight of the mixture of water or its hereinafter described equivalents, drying the mass, comminuting the dried mass, and forming the comminuted material into tablets.

Hexamethylenetetramine hippurate possesses the inherent applied use characteristics of being a valuable urinary tract antiseptic as described in U.S. Patent 3,004,026.

The manner and process of making and using the invention will now be generally described so as to enable one skilled in the art of chemistry to make and use the same as follows:

The conventional procedure for preparing hexamethylenetetramine hippurate as described in U.S. Patent 3,004,026 involves the refluxing of the reactants in methanol until a clear solution is obtained followed by reduction in volume by distillation to obtain the product by conventional crystallization techniques. Substantial volumes of solvent are required which results in losses of material in crystallization and in addition requires a solvent recovery process which adds to operating costs and plant investment.

In accordance with a first aspect of this invention, hexamethylenetetramine and hippuric acid are intimately mixed in the relative molar proportions of 0.8 to 1.0 mole of hexamethylenetetramine for each mole of hippuric acid in the presence of about 0.5 to about 12.5 percent by weight of the mixture of water (or an alkanol of 1 to 4 carbon atoms such as methanol, ethanol, n-propanol, isopropanol and n-butanol which are equivalents of water in the process). Intimate mixing is effected by use of conventional types of solids mixing equipment used in preparing intimate mixtures in the compounding of pharmaceuticals, for example a ribbon mixer, rotating pan mixer, paddle mixer and the like. The quantity of water or equivalent solvent is normally at the upper end of the above range when mixing equipment open to the atmosphere is used, whereas with enclosed mixing equipment, quantities at the lower end of the range are generally sufficient. It has been found that salt formation occurs rapidly during the mixing operation, as indicated by a change in the damp mass to a clumped powder accompanied by the evolution of heat.

The resulting clumped powder, constituting hexamethylenetetramine hippurate, is ready for subsequent formulation into pharmaceutical dosage forms such as tablets, capsules, elixers, suspensions and the like in accordance with conventional techniques.

In accordance with a second process aspect of this invention, substantially equimolar proportions of hexamethylenetetramine and hippuric acid are intimately mixed with about 0.5 to about 12.5 percent by weight of the mixture of water (or its equivalent 1 to 4 carbon atom alkanols) and the resulting clumped powder is dried, comminuted into granules and formed into tablets. To facilitate the formation of tablets with good resistance to breaking, polyvinyl pyrrolidone or equivalent binders, for example shellac, ethyl cellulose, gelatin, gum acacia or gum tragacanth, is included in the initial mixture of hexamethylenetetramine and hippuric acid in the proportions of about 0.1 to about 10 percent by weight of the mixture. As a result, the granules formed after the comminution step are in condition for tablet formation after the addition of customary lubricants such as stearic acid, talc, polyethylene glycol or magnesium stearate. The lubricant can also be included in the initial reaction mixture. In accordance with this aspect of the invention, chemical reaction to form the desired hexamethylenetetramine hippurate salt occurs simultaneously with preparation of a physical form of the salt suitable for tablet formation. This represents a marked simplification in the steps required to prepare tablets of hexamethylenetetramine hippurate under procedures heretofore known, since solvent recovery and crystallization steps are eliminated.

The best mode contemplated by the inventors for carrying out the invention will now be set forth as follows:

EXAMPLE 1

*Formulation*

| | | |
|---|---|---|
| Hexamethylenetetramine, N.F. | grams | 85.6 |
| Hippuric acid | do | 109.4 |
| Water, distilled | ml | 4.3 |

Pass hexamethylenetetramine and hippuric acid (equimolar proportions) individually through a 40-mesh screen on a comminutor, mix and pass the mixture through a 40-mesh screen. Add to the resulting free-flowing powder the water, with thorough blending. Some heat is generated during the blending and as the mixing is continued the character of the mixture changes from that of a damp granulation to a dry solidified or clumped powder. Pass the powder through a 10-mesh screen on an oscillating granulator, dry and then pass through a 16-mesh screen to yield particles of hexamethylenetetramine hippurate.

EXAMPLE 2

Slowly mix 220 grams hexamethylenetetramine and 280 grams hippuric acid (equimolar proportions—minus 40 mesh) with 6 grams polyvinylpyrrolidone and 11 ml. water with thorough blending. After completion of the reaction (evidenced by a change in consistency of the mass and increase in temperature), pass the mixture through a 10 mesh screen on an oscillating granulator, dry, blend with 10 grams magnesium stearate, and compress into 516 mg. tablets, each tablet containing 500 mg. hexamethylenetetramine hippurate.

The subject matter which the applicants regard as their invention is particularly pointed out and distinctly claimed as follows:

1. A method for preparing tablets of hexamethylenetetramine hippurate which comprises mixing equimolar proportions of hexamethylenetetramine with hippuric acid in the presence of a liquid medium consisting of water only present in an amount of between about 0.5 and about 12.5 percent by weight of the mixture, drying the mass, comminuting the dried mass and forming the comminuted material into tablets.

2. A method according to claim 1 wherein the mixing step is carried out in the presence of about 0.1 to about 10 percent by weight of the mixture of polyvinylpyrrolidone.

References Cited
UNITED STATES PATENTS 2,820,741    1/1958    Endicott et al. _____ 167—82
3,004,026   10/1961    Galat _____ 260—248.5

LEWIS GOTTS, *Primary Examiner.*

S. K. ROSE, *Assistant Examiner.*